United States Patent [19]

Thompson

[11] Patent Number: 4,698,516
[45] Date of Patent: Oct. 6, 1987

[54] HYDRO-ELECTRIC POWER PLANT

[76] Inventor: Douglas A. Thompson, Brown's Plaza, Ocho Rios P.O., St. Ann, Jamaica

[21] Appl. No.: 719,093

[22] Filed: Apr. 2, 1985

[51] Int. Cl.4 ...................... F03B 13/00; F03B 13/105
[52] U.S. Cl. ................................. 290/54; 415/DIG. 2
[58] Field of Search .............. 290/43, 52, 54; 405/75, 405/76, 77; 74/DIG. 9; 415/DIG. 2; 60/398

[56] References Cited

U.S. PATENT DOCUMENTS

| 1,704,417 | 3/1929 | Zoll | 405/75 |
| 1,742,068 | 12/1929 | Grasset | 405/77 |
| 2,783,392 | 2/1957 | Corbiere | 290/52 |
| 4,166,222 | 8/1979 | Hanley | 290/55 |
| 4,182,123 | 1/1980 | Ueda | 290/54 X |
| 4,241,283 | 12/1980 | Stoner, Sr. | 290/54 |
| 4,364,228 | 12/1982 | Eller | 290/52 X |
| 4,443,707 | 4/1984 | Scieri et al. | 290/43 X |

Primary Examiner—L. T. Hix
Assistant Examiner—Brian W. Brown
Attorney, Agent, or Firm—John Cyril Malloy

[57] ABSTRACT

A hydro-electric power plant specifically structured to operate in connection with a water reservoir supplied from a natural body of water such as an ocean, lake, etc. and which is structured to be at least partially self-sufficient while at the same time providing excess electrical energy in the operation of an auxiliary production facility such as an aluminum smelting plant.

8 Claims, 2 Drawing Figures

HYDRO-ELECTRIC POWER PLANT

BACKGROUND OF THE INVENTION

1. Field of the Invention

This invention relates to a hydro-electric power plant specifically designed to be used to drive an auxiliary production facility such as an aluminum production plant wherein electric power is derived from the passage and treatment of water from an artificial reservoir which is initially filled and continuously replenished through direct access to a natural body of water such as an ocean, lake, etc.

2. Description of the Prior Art

In modern-day society the availability and cost of energy has become a prime consideration to all industrialized peoples and nations of the world. Specifically, the cost of energy involving the expenditure of fossil type fuels has risen to a point where production facilities such as metal producing and working plants have become uneconomical to operate. The closing of such plants of course results in loss of jobs not only associated directly with the subject production facility but also in related and support facility as well as to the community and general geographical area at which such facility is located.

Accordingly, there is a recognized need in all industrial oriented geographical locations for a source of energy which is cheap, readily available, and which does not derrogatorily affect the environment by adding polution thereto. Existing prior art structures particularly directed to hydro-electrical power plants or energy producing facilities of the type mentioned above are set forth in the following U.S. Pat. Nos. 1,704,417, to Zoll; Grasset, 1,742,068; Corbiere, 2,783,392; Ueda, 4,182,123; Storer, 4,241,283; and Eller, 4,364,228. The structures and energy producing systems of the type representative of the above-noted patents are similar in nature in that they all involve the treatment of water from or to a natural or structured reservoir and the processing of water through relatively conventional electrical components including generators, turbines, etc. for the eventual production of electrical energy.

While it is assumed that the structures of the type set forth above are operable for their intended purposes, frequently such systems do not solve what may be considered the larger industrial demands normally associated with auxiliary production facilities such as aluminum or like metal production or processing plants. Accordingly, there is still a need in industrial oriented societies for an inexpensive and readily available source of energy capable of supplying quantities of energy sufficient to operate highly industrialized and relatively sophisticated facilities such as the aforementioned metal processing and production plants, etc.

SUMMARY OF THE INVENTION

The present invention is directed towards an energy producing or power plant specifically designed and structured for use in association with a natural reservoir of water such as the sea, ocean, lakes, river, etc. More specifically, the facility of the present invention comprises an artificial or structured reservoir designed to hold a predetermined quantity of water sufficient to run the system, to be described hereinafter, on a continuous basis. The reservoir is supplied with water from a natural reservoir such as a sea or ocean by a plurality of water supply pipes and/or a separate but cooperating conveying system. A receiving end of each of such pipes is located in submerged relation within the natural reservoir (sea, ocean, etc.) to a certain depth. This receiving end has a funnel or other specifically shaped configuration of structural element associated therewith to maximize inflow of water into the pipes. Inflow of water from the natural reservoir is aided by a powered pump (electrical or other power source). The pipes then carry the water from the natural reservoir into the structured reservoir. Depending upon the particular application and/or location of the subject facility, water may be supplied through the water supply pipes and/or conveying system on a continuous basis due at least in part to a siphoning action. In the latter case, the structured reservoir is located somewhat below the point of inflow of the water from the natural reservoir into the supply pipe and siphoning action occurs from the natural reservoir into the structured reservoir through siphoning action in the well-known manner. Alternately, the reservoir may be filled by means of natural travel or movement of the water such as due to waves, current, thermoclines, etc. When such natural movement of the water is taken advantage of, additional valving techniques are incorporated into the water supply facility to prevent backflow of water forced into the inflow ends of the supply water pipes due to the aforementioned natural wave, current, etc. action of the water within the natural reservoir. Another embodiment of the present invention contemplates that the reservoir be of a size and structure sufficient to maintain such reservoir in a closed environment. Such environment would then be maintained under a predetermined negative pressure or partial vacuum so that water would be forced in the structured reservoir from the natural reservoir, still utilizing the natural wave or current motion of the water while at the same time facilitating travel of the trapped water through the supply pipes based on the maintenance of the aforementioned partial vacuum.

The present invention further comprises a pressure flow tunnel structured in direct communication with an under or lower portion of the structured reservoir. A plug assembly serves to normally close the interior of the tunnel from the interior of the structured reservoir so as to prevent water flow therebetween. However, when operation of the facility is desired, the plug is removed through operation of various mechanical devices including fluid or electrically operated lifting mechanisms serving to displace the closure plug from its flow stopping position. Once removed, water is allowed to pass in predetermined and regulated continuous amounts from the structured reservoir into the pressure tunnel.

A predetermined number of electrical generators are disposed in communicating relation with the pressure tunnel and more specifically includes structural adaptation such as water wheels or the like which are actively driven by the water passing through and along the length of the pressure tunnel. The generators are thereby driven through the natural flow of water, due to gravity and serve to produce electrical energy through this interaction. The distal end or exiting portion of the pressure flow tunnel communicates back with the natural reservoir so as to affect a recycling of the processed water initially received from the natural reservoir.

Another structural feature of the present invention is the inclusion of an additional or auxiliary water wheel structured and disposed in water receiving relation to the discharge end or portion of the pressure tunnel. The water wheel is thereby rotated through contact with the exiting water and is further interconnected in driving relation to a water pump means. Such water pump means additionally serves to force water from the natural reservoir through proper auxiliary or starter conduits back into the structured reservoir for added fill or water supply into the structured reservoir. Continuous flow is thereby assured since the water starter pump are activated upon water passing through the discharge portion of the pressure tunnel.

Additional structural features of the present invention comprise the provision of air compressor means disposed in fluid communication with the interior of the pressure tunnel at various points along the length thereof. Air from the compressor is forced into the pressure tunnel and basically entrained into the flow of water traveling along the length of the pressure flow tunnel. This facilitates the passage of water through the pressure flow tunnel from the structured reservoir. The air compressor may be driven by auxiliary power issued from the generator and/or from additional independent power source which may be associated with or specifically structured to serve as a hydro-electric power system independent of the facility or plurality of generators associated with the pressure flow tunnel.

In a preferred embodiment of the present invention, as described in detail hereinafter, the hydro-electric power facility of the present invention is primarily designed to produce usable power in the form of electrical energy whereby sufficient power is generated through driven activation of the plurality of generators to at least partially power and operate an auxiliary facility such as a metal production or processing plant and in particular, an aluminum smelting plant. In order to maximize efficiency through the operation of such a metal producing plant the excess heat produced through the operation and maintenance of a furnace facility associated therewith is channeled through a steam generator which in turn is disposed in interconnecting and/or driving relation to an electrical generator for the auxiliary production of electrical power which is then utilized to drive the main facilities of the aluminum smelting plant. It is recognized that the power generated from channeling the excess heat from the furnace structures associated with the aluminum smelting plant is in and of itself not sufficient to drive the smelting plant because of obvious efficiency restrictions. It is contemplated that the combination of the excess power produced from the excess heat from the furnace structure, in combination with the power generated by the hydro-electric generator facilities associated with the natural and structured reservoirs as set forth above, will collectively be capable of running the aluminum smelting plant or like auxiliary high production industrial facility.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
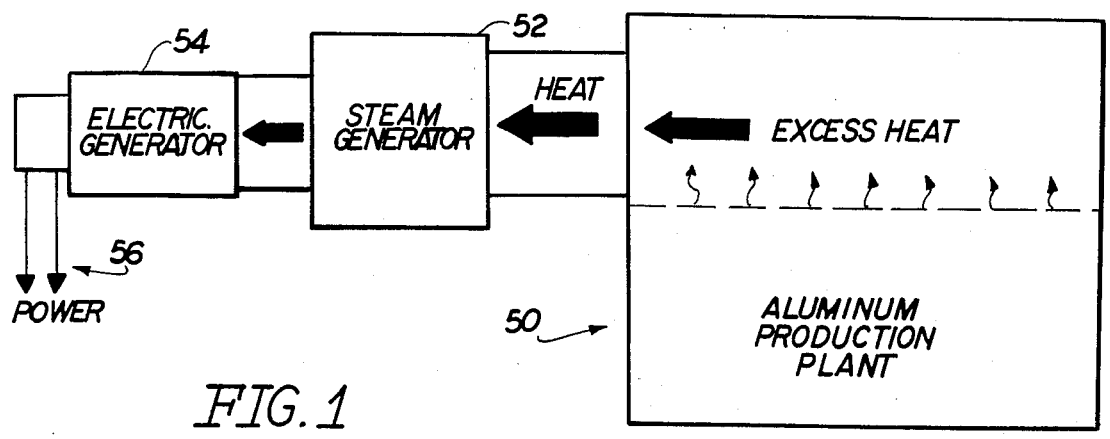
FIG. 1 is a schematic representation of a large scale, high output production facility such as a metal production or processing plant incorporating power producing facilities from normally excess or wasted heat production.
Figure 2:
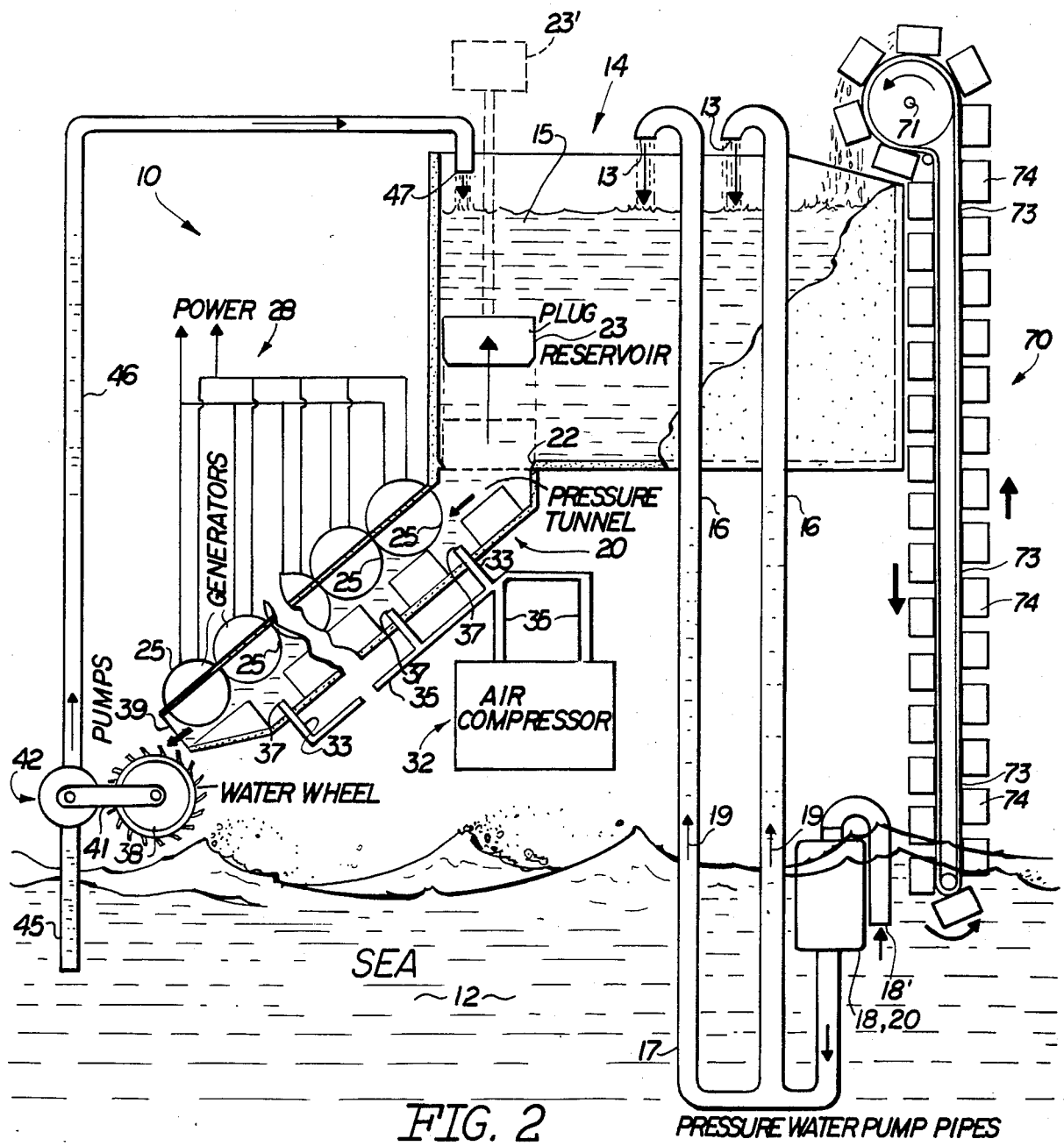
FIG. 2 is a schematic representation of the hydroelectric producing facilities of the present invention.

The hydro-electric power plant and associated production facility of the present invention is represented in FIGS. 1 and 2 and comprises a power producing facility generally indicated as 10 located adjacent to and in combination with a natural water reservoir generally indicated as 12 such as an ocean, sea, lake, etc. A structured or man-made reservoir generally indicated as 14 is constructed to receive and maintain water therein. Water 15 is initailly supplied through a water supply means as at 13 through a plurality of supply conduits 16. Each receiving end 17 of supply conduits 16 and/or a portion of conveyor system generally indicated as 60. The supply conduits 16 are disposed at a predetermined depth below the surface of the natural reservoir 12, a water receiving structure 18 specifically structured and disposed to facilitate entrance or water flow therein from the reservoir 12 as at 18'. As indicated by appropriate directional arrows 19, water is forced to travel through the conduits 16 into the structured reservoir 14 for filling and placement of the water 15 therein on a continuous basis. The driving or motive force for such supply of water to conduit 16 may comprise a syphoning action aided or primarily driven by a pump means 20. The water receiving structure 10 incorporate the pump means 20 and for purposes of clarity, the pump means is not shown in detail. However, also for purposes of clarity, the water receiving structure 18 and the pump means 20 are collectively designated as 18, 20. The pump means may be electrically or mechanically driven from an external power source and be disposed in fluid communication between water receiving structure 18 and support conduit 16.

Alternately, the reservoir 14 can be maintained under a predetermined negative pressure or partial vacuum (not shown) and the receiving ends 18' are disposed and structured to receive water due to natural water flow within the natural reservoir 12 and again aided by pump means 20. More specifically, such natural flow of water may be due to natural wave action, current flow, thermoclines or other natural phenomenon associated with the movement of the water within the confines of the natural reservoir 12. In such latter embodiment, additional one-way valving structure would be supplied to the individual conduits so as to prevent backflow of the water forced into the conduits by the afore mentioned natural water flow (currents, wave action, etc.). Yet another embodiment incorporates a conveyor system 70 which may assume a number of varied structural configurations. Representative of such structures is a driving pulley or roller (applicably powered) as by a conventional externally powered electric motor or the like as at 71 connected in driving engagement to a belt structure 73 having a plurality of water carrying conveyor elements 74. As indicated by the directional arrows water is thereby transferred from natural reservoir 12 to structured reservoir 14. Regardless of the motive force applied, the water is forced through the conduits 16 from the natural reservoir 12 into the structured reservoir 14 on a continuous basis, as long as operation of the power plant 10 is continuously operated.

Such operation occurs through the establishment of communication between a pressure flow tunnel generally indicated as 20 disposed in direct fluid receiving and/or communication with a lower portion of the structured reservoir 14 such as at 22. Opening 22 represents a communicating opening which may be selectively closed by a plug structure 23. Such plug structure may serve to stop water flow from the structured reservoir 14 into the interior of the pressure flow tunnel 20. However, when the power producing facility 10 is desired to be placed in operation, the plug 23 is removed from its closed position (represented in broken lines in FIG. 2) to its open position to allow fluid flow through opening 22. Such selective positioning of the plug structure 23 may occur through any mechanically expedient means such as hydraulically powered jacks or other associated lifting devices, schematically represented in broken lines in FIG. 2 as 23'.

The pressure flow channel 20 is disposed at a vertically declining or generally angularly oriented position so as to facilitate liquid flow from the structured reservoir 14 therethrough. Such water flow serves to physically drive a predetermined number of generator structures 25. In a preferred embodiment 13 of such generators are utilized wherein one turbine generator 25' is structurally designed and electrically interconnected to carry the associated turbine generators 25 wherein such turbine generators are capable of producing electrical power in the range of 300,000 megawatts. As will be described in greater detail hereinafter, power takeoff generally indicated as 28 may be utilized and interconnected to an auxiliary production facility generally indicated as 50 to be described in greater detail hereinafter.

In order to facilitate liquid flow from structured generator 14 throughout the length of the pressure flow tunnel 20, an air compressor means generally indicated as 32 is disposed in fluid communication through headers 33 and interconnecting conduit 35 with the interior of the pressure flow tunnel 20. Therefore, as water flows along the length of the tunnel 20 as indicated by appropriate directional arrows, such flow is facilitated due to the injection of compressed air at various spaced intervals along the length of the tunnel 20 as at 37. This flow through pressure flow tunnel 20 serves to efficiently drive the predetermined number of generators 25 results in the power output as at 28.

The pressure flow tunnel 20 further includes a discharge point 39 for emptying the water flowing through channel 20 back into the natural reservoir 12. However, a water wheel or like driving structure 38 is disposed in interruptive relation with water flowing from discharge portion 39 as such water empties back into the natural reservoir 12. Accordingly, the water wheel is rotated on a continuous basis. The water wheel 38 is drivingly connected through proper linkage 42 to water pump means 44 which may comprise, in the preferred embodiment, a plurality of water pumps also serving to deliver water from the natural reservoir 12 through entrance and delivery conduits 45 and 46 into structured reservoir 14 as at 47.

When plug 23 is removed to effect operation of the power producing facility 10, water is supplied on a continuous basis through the activation of the pump means 42 in addition to the initial and continuous supply facility from water supply conduit 16.

As set forth above, the resulting electrical energy or driving power 28 is interconnected to accomplish power takeoff wherein such power is utilized to drive an auxiliary high capacity our output industrial facility generally indicated as 50 such as an aluminum smelting plant or like metal processing or production plant.

Typically in the operation of such a metal processing plant, an extreme amount of excess heat is produced and generally passed to waste. However, incorporated in the system of the present invention is the capture and recycling of such excess heat through the provision of a stream generator 52 serving to interconnect and power an electric generator 54 which in turn produces usable power generally indicated as 56. Such power is then recycled back into the operation of the aluminum smelting plant or like facility 50. It is recognized that power takeoff 56 will not result in sufficient power to drive or operate the facility 50 in and of itself. However, the present invention contemplates the collective channeling of power from respective power takeoffs 28 and 56 for the effective operation of the industrial production facility which may be an aluminum smelting plant as at 50 incorporating the power producing facility of the present invention.

It is therefore to be understood that the following claims are intended to cover all of the generic and specific features of the invention herein described, and all statements of the scope of the invention which as a matter of language, might be said to fall therebetween.

Now that the invention has been described, what is claimed is:

1. A hydro-electric power producing assembly of the type primarily designed to supply energy to a high capacity industrial facility, said assembly comprising:

(a) a structured reservoir disposed in communicating relation to a natural reservoir and dimensioned and configured to contain a predetermined minimum amount of water, (b) supply means disposed in interconnecting relation between said structured reservoir and the natural reservoir and structured to transfer of water from the latter to the former, said supply means powered by an external power source, (c) discharge means mounted on said structured reservoir for regulating discharge of liquid therefrom, (d) a flow channel disposed adjacent said discharge means and in water receiving relation to said structural reservoir, said flow channel disposed to extend downwardly from said structural reservoir and structured to define a continuous gravity flow of water along the length thereof;

(e) a plurality of generator assemblies disposed successively along the length of said flow channel in driven engagement with said continuous gravity flow of water therealong, whereby continuous power is generated by said plurality of generators upon continuous discharge of water from said structured reservoir, (f) air supply means including a source of pressurized air disposed in fluid communication with said flow channel means and structured for the supply of pressurized air into said gravity flow of water, (g) said air supply means comprising a plurality of air inlets disposed in spaced relation to one another along the length of said flow channel, each of said inlets being structured to inject a flow of pressurized air into said continuous gravity flow of water along the length of said gravity flow of water, (h) supplementary supply means including a pump assembly disposed in interruptive relation to an exiting water flow from said flow channel and structured to supply water from said natural reservoir to said structured reservoir during passage of said exiting water flow, whereby water is continuously supplied to and discharged from said structured reservoir, (i) said supplementary supply means further including an externally powered conveyor means disposed in communicating relation with both said structured reservoir and said natural reservoir for transferring water from the latter to the former, and (j) a power take off means structured for channeling collectively produced power from said plurality of generators to a power user facility.

2. An assembly as in claim 1 wherein said supply means comprises a conduit assembly having a discharge end disposed in water delivering relation to said structured reservoir and a receiving end disposed in a submerged position within the natural reservoir at a depth sufficient to facilitate water entrance therein.

3. An assembly as in claim 1 wherein said conduit assembly comprises a plurality of conduits each comprising a discharge end disposed to deliver water to the interior of said structured reservoir and a receiving end submerged within said natural reservoir at a depth sufficient to facilitate entrance of water into said respective conduit.

4. An assembly as in claim 3 wherein each of said conduits include a receiving structure secured to an extremity of said receiving end and structured and configured to facilitate reception of water therein.

5. An assembly as in claim 1 wherein said flow channel means is disposed in declining angular orientation from said discharge means to said natural reservoir, whereby water exiting said structured reservoir is returned to said natural reservoir.

6. An assembly as in claim 5 wherein said supplementary supply means further includes a pump driving means disposed in engaging, interruptive relation with said exiting water flow, said pump driving means structured to continuously drive said pump upon passage of said exiting water flow.

7. An assembly as in claim 6 wherein said pump driving means comprises a water wheel structure disposed in interruptive, driven relation to exiting water flow from said flow channel and structured to continuously drive said pump assembly.

8. An assembly as in claim 7 wherein said supply means further comprises a conduit disposed in fluid communication with said pump assembly and between said natural reservoir and said structured reservoir.

* * * * *